United States Patent
Hernando Grande et al.

(10) Patent No.: US 6,492,746 B1
(45) Date of Patent: Dec. 10, 2002

(54) CURRENT SYSTEM FOR COMPENSATING THE MAGNETIC FIELD PRODUCED BY ELECTRIC TRACTION RAILWAYS

(75) Inventors: Antonio Hernando Grande, Las Rozas (ES); Guillermo Rivero Rodriguez, Las Rozas (ES); Fernando Briones Fernandez Pola, Las Rozas (ES); Pilar Marin Palacios, Las Rozas (ES)

(73) Assignee: Universidad Complutense de Madrid, Madrid (ES)

( * ) Notice: Subject to any disclaimer, the term of this patent is extended or adjusted under 35 U.S.C. 154(b) by 0 days.

(21) Appl. No.: 09/647,724
(22) PCT Filed: Feb. 3, 2000
(86) PCT No.: PCT/ES00/00035
§ 371 (c)(1),
(2), (4) Date: Dec. 11, 2000
(87) PCT Pub. No.: WO00/46064
PCT Pub. Date: Aug. 10, 2000

(30) Foreign Application Priority Data

Feb. 4, 1999 (ES) .................................................. 9900237
Feb. 3, 2000 (ES) .................................................. 2000236

(51) Int. Cl.[7] .............................................. H04B 15/00
(52) U.S. Cl. .......................... 307/91; 307/89; 307/104; 174/32
(58) Field of Search ........................... 307/94, 104, 89; 174/32, 34, 36

(56) References Cited

U.S. PATENT DOCUMENTS 5,068,543 A * 11/1991 Ohkawa ........................ 307/91
5,616,969 A * 4/1997 Morava ........................ 307/91

FOREIGN PATENT DOCUMENTS

| DE | 28 29 578 | 1/1980 | |
|---|---|---|---|
| DE | 3410726 A1 | 9/1985 | |
| DE | 196 42 677 A1 | 4/1998 | |
| WO | WO 95/11541 | * 4/1995 | ............ H02G/7/22 |
| WO | WO 00/46064 | 8/2000 | |

* cited by examiner

Primary Examiner—Stephen W. Jackson
Assistant Examiner—Robert DeBeradinis
(74) Attorney, Agent, or Firm—Katten, Muchin, Zavis, Rosenman

(57) ABSTRACT

The invention relates to a device which can compensate, at origin, the magnetic field perturbations in the surroundings of an electrically-driven train track caused by variations in the current of the power supply catenary.

The object of the system is to create a return circuit with a geometry which varies with the position of the train, causing the suppression at origin of the field produced by the catenary-train-track circuit and thus reducing perturbations of the magnetic field in the surroundings.

The system relies on shunting the return current from the track divided in to elementary segments insulated from each other, to a return conductor placed near the catenary and parallel to it, using a series of vertical conductors which connect each segment to said return conductor.

10 Claims, 5 Drawing Sheets

CURRENT SYSTEM FOR COMPENSATING THE MAGNETIC FIELD PRODUCED BY ELECTRIC TRACTION RAILWAYS

OBJECT OF THE INVENTION

The present invention relates to a device which can compensate, at origin, the magnetic field perturbations in the surroundings of the tracks of an electrically driven train caused by variations in the current of the power supply catenary.

The method relies on shielding the magnetic field with a circuit of suitable geometry to compensate or reduce the field created by power lines of an electrical train.

The method consists of reducing the magnetic field created by the variations in the power catenary current by rerouting the return currents in the tracks. This rerouting is achieved by conductors placed perpendicular to the track and is directed towards a conductor parallel to the catenary. Thus, fluctuations of the magnetic field caused y current fluctuations in the loop formed by the catenary and the return conductor may be compensated at origin regardless of the distance and orientation of the receiver of the perturbation with respect to the path of the train.

The system is applied only to segments of the underground line which are near areas requiring shielding for diverse reasons.

BACKGROUND OF TH INVENTION

Nowadays there are growing problems with electrical systems, computers, electron microscopes, nuclear magnetic resonance units, etc. due to perturbations of the Earth's magnetic field mainly caused by underground metropolitan trains which run nearby or under the sites in which these are installed. The problem is particularly serious for trains powered by a catenary line and current return on the tracks, and particularly when employing low voltage direct current (0, 6–3 KV), and therefore high currents, on the order of 1–10 KA. In these cases the variable magnetic field created by current variations in the catenary-train-track loop reaches large values, on the order of the Earth's magnetic field at distances on the order of 100 metres from the train line.

In certain cases magnetic shielding of the affected equipment has been proposed as a solution. On occasions it is simply the Earth's magnetic field that is shielded (WO9738534). This method suffers from disadvantages as it never obtains reductions above one tenth of the field which is shielded, and is expensive.

Shielding of the source of the perturbation, such as shielding the train tunnel with a magnetic metallic material causes interactions with radiotelephony, capacitance problems and is extremely costly.

The ideal method to eliminate perturbations would be to practically annul the area of the current loop by having a return current conductor near and parallel to the catenary, or equivalently a catenary power supply conductor placed between the tracks. However, as the train is moving and with it the point at which the catenary-train-track circuit is closed, the geometry or size of the loop originating the perturbation field are also variable and therefore cannot be compensated with a return conductor with a fixed geometry.

Compensation at origin using return circuits has been performed by other authors (WO9633541) for high voltage lines. The difference between these systems and the one here considered is that, firstly, the field to be compensated is geometrically invariant over time, while the object of the present Patent is to shield a magnetic field which varies in a non-uniform manner. Other latter inventions (application P9802654) deal with the problem at the source of the perturbing field and instead of shielding with ferromagnetic metallic material use a compensation current loop controlled by magnetic field sensors.

The present invention, instead of compensating at the source with active compensation loops uses the same catenary-train-track power supply current so that, through a return conductor parallel to and near the catenary, the loop causing the perturbations is eliminated. This is achieved by an electrical sectioning of the track in which perturbations must be eliminated and taking the return current to the catenary by vertical conductors placed symmetrically on the walls of the tunnel or on the catenary support columns in open air lines.

DESCRIPTION OF THE INVENTION

The system of currents for compensating the magnetic field produced by electrically driven trains, object of the present invention, is based on reducing the effect of current fluctuations produced by power absorption and release of electric traction engines which generate a strong magnetic perturbation field in catenary powered trains where the track-engine-catenary-substation form a large surface current loop- All of this is achieved by a conductor located in the top area of the tunnel parallel to its section, which we shall term the return conductor. Only at areas where this is desired, the track shall be sectioned into successive electrically insulated conductor segments mutually insulated from each other, allowing to install as many return conductors as are required to obtain the displacement of the engine along the shielded area. The length of the sectioned segments is calculated and optimised considering the size of the engine and the geometrical conditions which provide the optimum results.

Specifically, and with reference to the description of the figures, the system of currents for compensating the magnetic field produced by electrically powered trains consists in creating a current to compensate the magnetic field produced which, according to FIG. 1, begins at substation (1), passes through catenary (4), reaches engine (2) and returns along tracks (5). Likewise, and with reference to the figures, FIG. 3a shows the first case object of study. As we are here outside the shielded area and on the side of the substation (left) current returns in the normal manner and through the track. FIG. 3B shows the return when still beyond the shielded area we are on the opposite side of the substation (right). In this case it is necessary to use the return conductors (6) as shown in the sketch. The current from the substation arrives, through the catenary, to the engine, from where it returns along the tracks until reaching the first vertical conductor, which shunts it to the horizontal return cable parallel to the catenary. In this manner it crosses the dangerous area and once it is crossed descends along a vertical conductor to the track finally reaching the substation. The dotted line shows the geometry of the current circuit. With this new geometry two objectives are obtained: reducing the are of the track-engine-catenary-substation circuit and obtaining, in the area object of the shielding, a compensation of the catenary current by the return current parallel to it.

When entering a danger area (FIG. 4), on the side nearest the substation, the cut performed in the track allows to design a favourable return current (FIG. 4A). The current arriving from the substation reaches the engine, returns along the track along a short segment and just before reaching the cut rises along a return conductor to the horizontal one. Along the horizontal conductor it reaches another vertical conductor beyond the cut, along which it descends to reach the substation along the track. Thus, the surface area of the circuit is also reduced and in a small area a return current parallel to the catenary is obtained. FIG. 4A' shows the appearance of the circuit if the engine moves away from the substation and the same return circuit is used. The lack of cuts in the tracks would force us to use the same vertical return conductor. In this case in addition to having a circuit with an enormous area there would not be a return current parallel to the catenary.

FIG. 4B shows the situation of 4A' but here with cuts made in the track. This allows to install as many vertical return conductors as desired. As the engine advances, it will use the one nearest to it. This allows to minimise the circuit area and to have a return current parallel to the catenary.

It must be remarked that an circular arc-shaped current (6) leaves each rail (FIG. 5). In other words, what is represented in FIGS. 3 and 4 as a vertical line is in fact the sum of two arc-shaped currents. The sum of these two currents is the total current. The current intensity is greater on that with the highest impedance. Note that this geometry is quite favourable as the composition of the magnetic fields created by each one is practically negligible. FIG. 5 also shows the point of contact between the engine wheel and the track (9).

The main objectives of the present invention may be considered as two: to reduce the area of the track-engine-catenary-substation circuit loop and, in the area to be shielded, to maintain a current in the conductor parallel to the catenary and in the opposite direction in order to achieve a cancellation of the magnetic field.

The device is characterised by the attenuation factor s. This factor is defined as the quotient between the attenuated field and the initial field.

DESCRIPTION OF THE DRAWINGS

The characteristics of the invention shall be more clearly understood in view of the accompanying drawings which form an integral part of the description, in which the following is shown:

FIG. 4A shows the circuit between engine (2) and substation (1) suing return conductors (6); (4) is the catenary, (5) are the tracks, (7) are the cuts in the track.

FIG. 4A' shows the circuit if engine (2) were moving away from the substation and the same return circuit of FIG. 3A used.

FIG. 4B shows the situation of 4A' but here with cuts (7) provided in the track.

PREFERRED EMBODIMENT OF THE INVENTION

The present invention is illustrated by the following example of a preferred embodiment of the same, made with reference to the figures.

Figure 1:
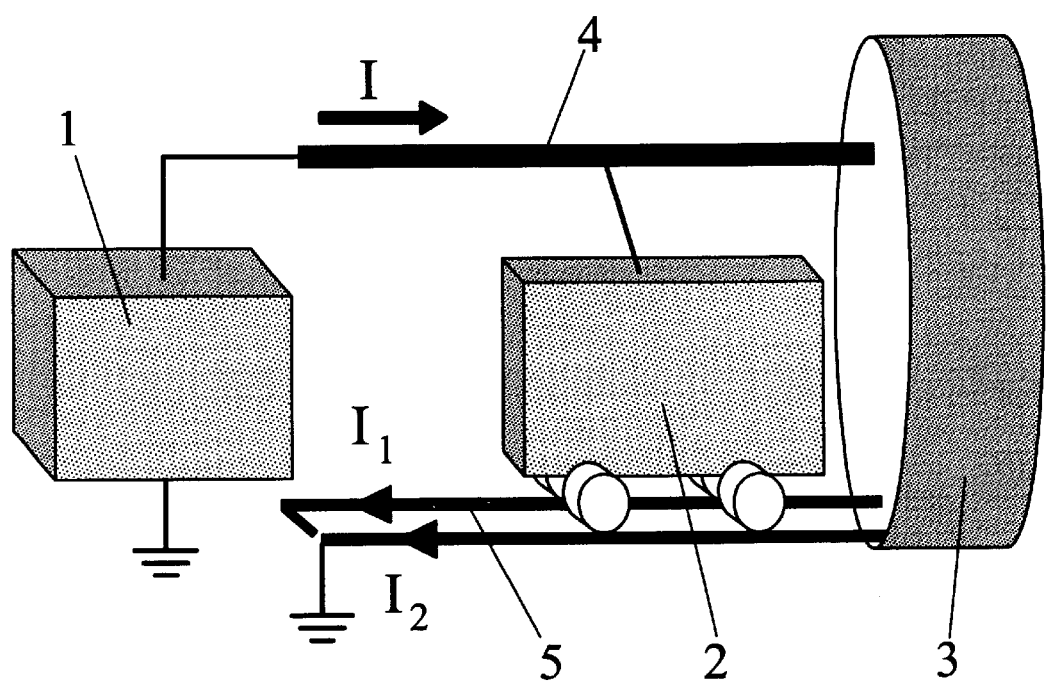
FIG. 1 shows the current circuit (track-engine-catenary-substation) which causes the magnetic field. (1) is the substation, (2) is the engine, (4) is the catenary, (5) are the racks, (3) is the tunnel. I is the current in the catenary and $I_1$, $I_2$ are the currents in the tracks.
Figure 2:
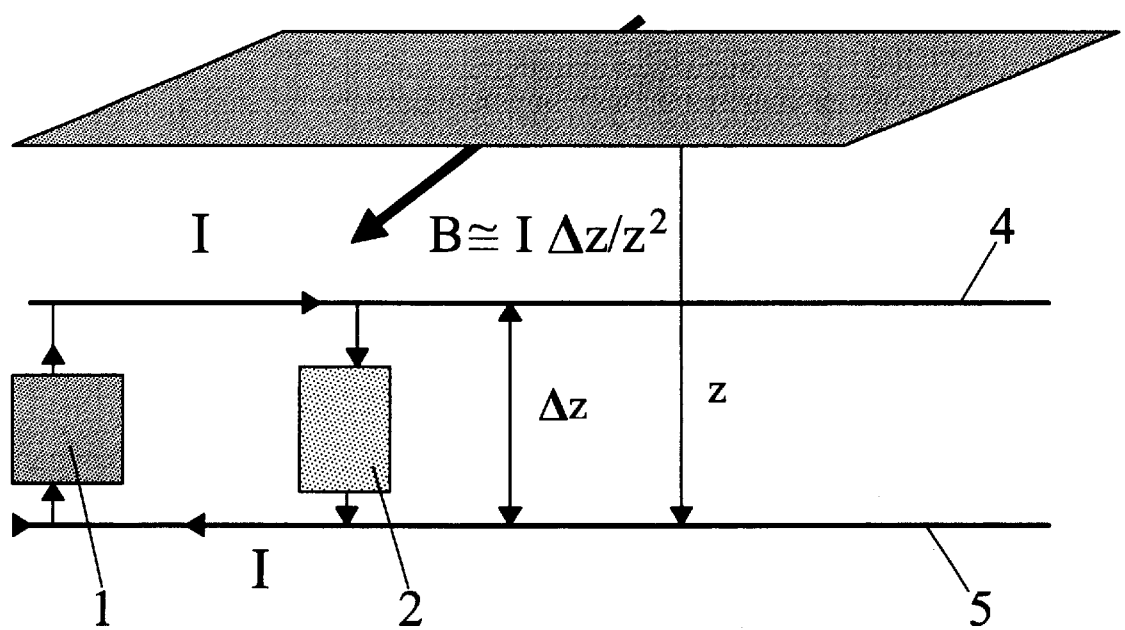
FIG. 2. shows a sketch of the current circuit causing the magnetic field, as in FIG. 1. It shows the mathematical expression $B \cong I \Box z/z^2$ where (1) is the substation, (2) is the engine, z the height, $\Box z$ the height increase, (4) the catenary, (5) the track with a current $I=I_1+I_2$ equal to that on the catenary. It must be noted that here the two tracks are reduced to a single conductor (5) with a current I equal to the catenary current and corresponding to the sum of the currents on each track.
Figure 3A:
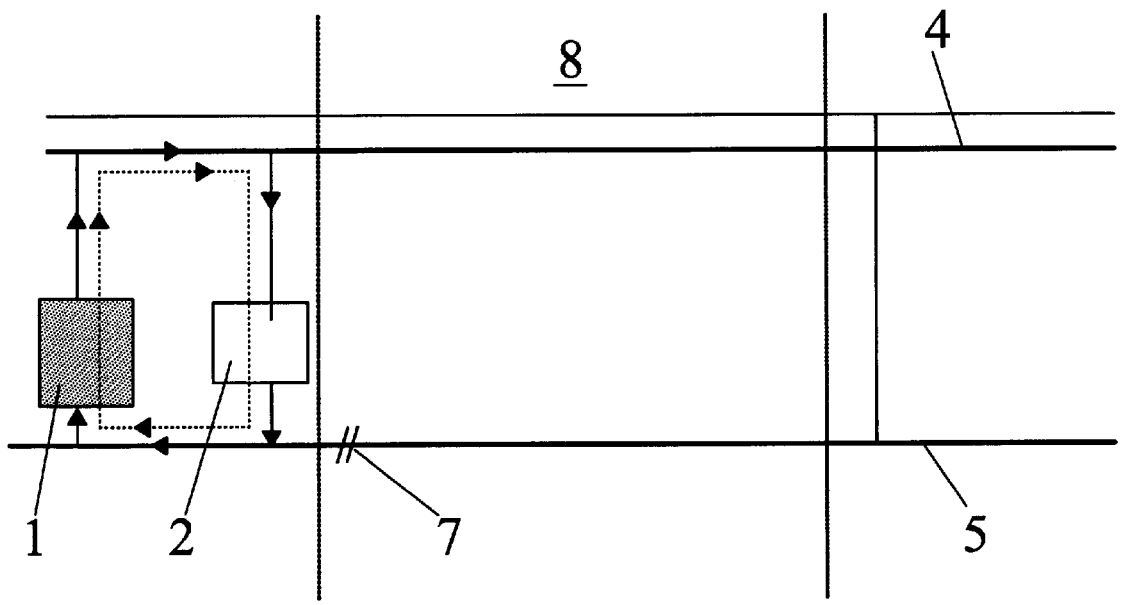
FIG. 3 shows a sketch of the shielding when the train is just ahead of (3A) and just after the area to be protected (3B). Where (4) is the catenary, (5) is the track, (6) are the return current conductors, (7) is the cut in the tracks and (8) is the area to be shielded.
Figure 3B:
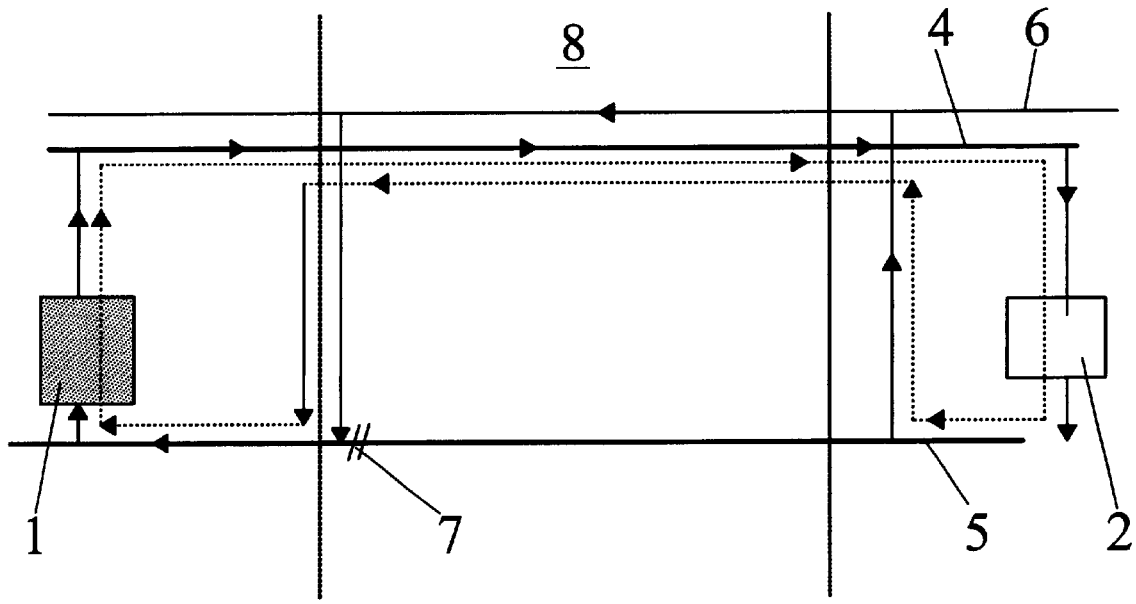
Figure 4:
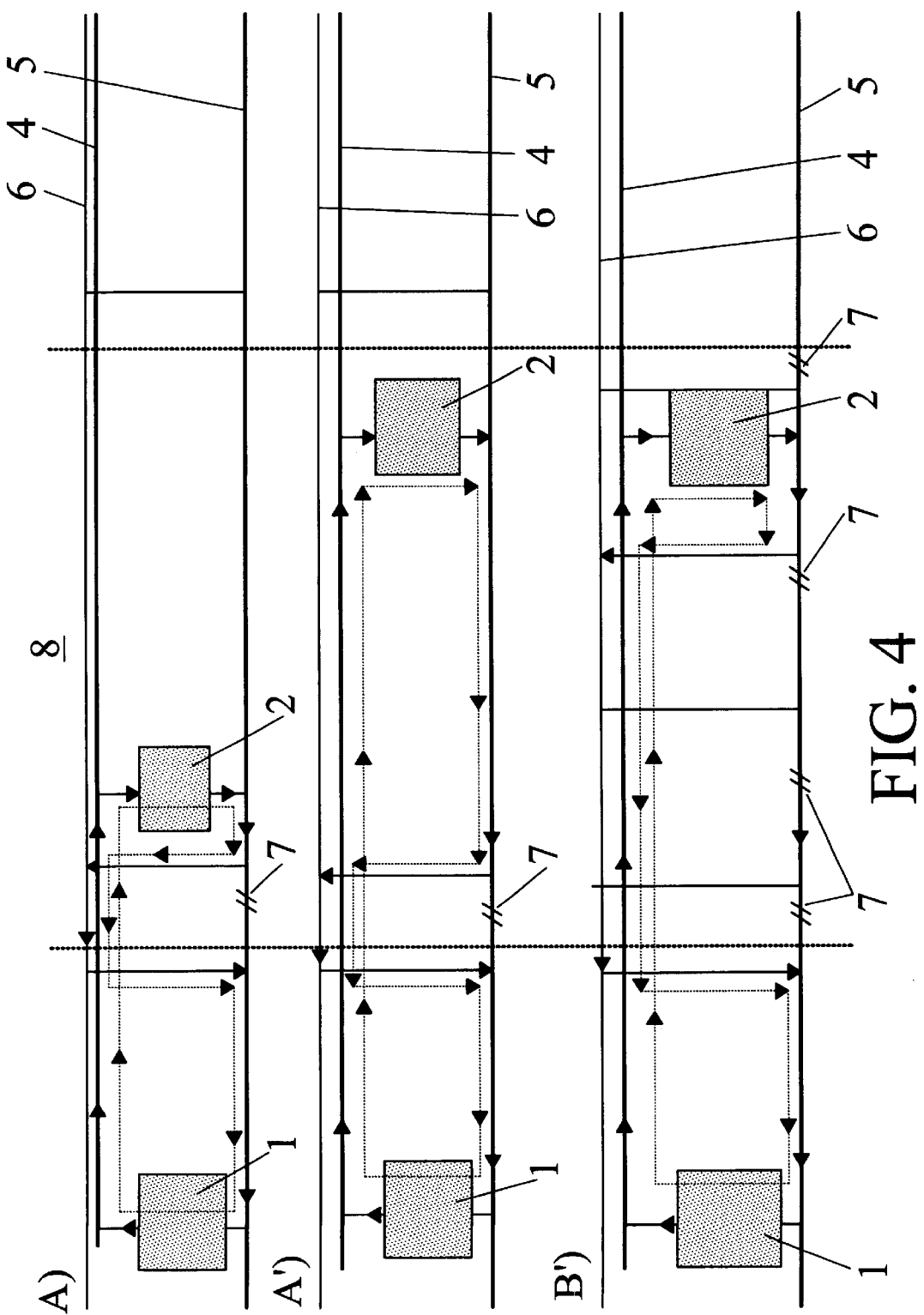
FIG. 4 shows the situation when the engine enters the dangerous area.
Figure 5:
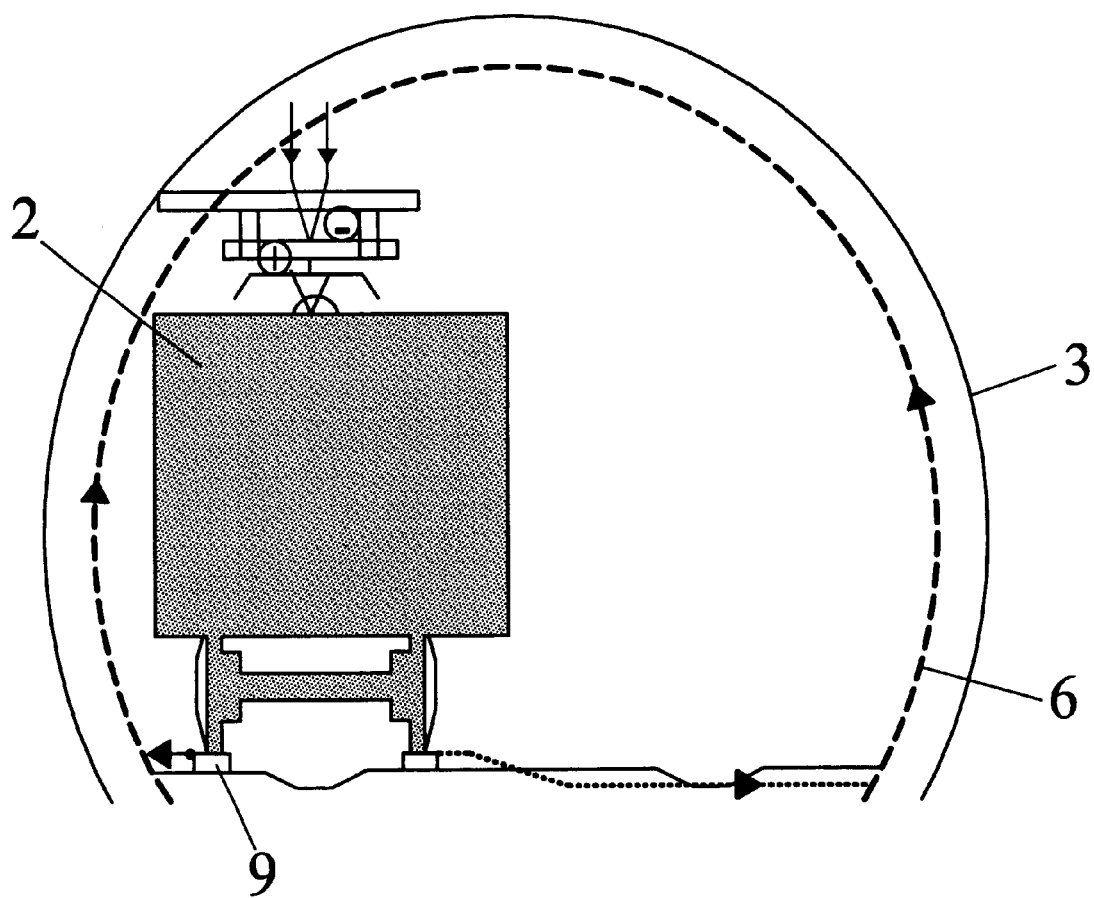
FIG. 5 shows a section of tunnel (3) showing the geometry of the vertical return current (6); (9) are the rails, (3) is the tunnel (2) is the engine.

A practical embodiment of the system claimed has been executed in a segment of underground line which due to its properties produced a perturbing magnetic field at floor level on the order of 15 $\mu$T. The return conductor (FIG. 4 A (6)) was suspended from the catenary (FIG. 4 A (4)) at a distance of 20 cm and the vertical conductors were placed as arcs, as shown in FIG. 5, on the walls and ceiling of the tunnel on track segments 18 m. long. The total length of the compensation area is 300 m. With this a reduction of the perturbing field of up to 1.0 $\mu$T was obtained in the worst of cases. Measurements were made for different situations, from the most favourable to least favourable. Normal circulation of a single train, moving, stopping and starting again, moving, stopping on a slope and starting again. Circulation of two trains, one on each track, with starting orders given so that both trains coincide in motion in the special area Allowing one train to circulate and the other stopping then starting in the danger area. Emergency braking and starting again, etc.

What is claimed is:

1. A circuit for compensating a magnetic field produced by electrically driven trains; comprising:
    a substation power supply for providing current to a train engine;
    a first catenary for directing current from the power supply to the train engine; and
    a pair of tracks for returning current from the train engine to the power supply, characterised in that
    the return current is rerouted away from the tracks using alternative return conductors interposed between the train engine and power supply that limit a cross-sectional area of the circuit between catenary and track portions of the circuit to a predetermined maximum area regardless of a distance between the train engine and the power supply.

2. A circuit according to claim 1, characterised in that a second catenary parallel and close to the first catenary receives and carries current from the alternative return conductors to the power supply in an opposite direction to current carried by said first catenary.

3. A circuit according to claim 1, by which a pair of return conductors which reroute the current on the tracks to the second catenary are in a plane perpendicular to a plane defined by the tracks and parallel to a section of a tunnel housing portions of the first and second catenaries and the tracks.

4. A circuit according to claim 3, in which pair of return conductors comprises two circular arc-shaped conductors.

5. A circuit according to claim 1, characterised in that the sum of the currents in the return conductors is substantially equal to the current in the second catenary.

6. A circuit according claim 1, in which each track is provided with one or more cuts in order to electrically insulate track sections of a given length.

7. A cicuit according to claim 6, characterised in that the sections made in the tracks and the vertical return conductors are configured to minimise a cross-sectional area of the circuit as defined by the power supply, first and second catenaries, tracks and train engine.

8. A circuit according to claim 6, by which the sections provided in the tracks and the vertical return conductors are configured to maximize a distance over which return currents run in the second catenary parallel to the first caternary.

9. A cricuit according to claim 1, in which the first catenary is cut into segments and current is taken from each segment by one or more vertical supply conductors connected to a power line placed parallel and close to at least one track.

10. A circuit according to claim 1, by which the fluctutations of the magnetic field caused by fluctuations in the catenary current are compensated at the power supply.

* * * * *